US006760410B1

(12) United States Patent
Lee

(10) Patent No.: US 6,760,410 B1
(45) Date of Patent: Jul. 6, 2004

(54) COMPUTER HAVING AUTOMATIC ANSWERING STATE DISPLAYING AND PROCESSING FUNCTIONS AND METHOD OF PROCESSING AUTOMATIC ANSWERING

(75) Inventor: Joon Lee, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/390,655

(22) Filed: Sep. 7, 1999

(30) Foreign Application Priority Data

Sep. 4, 1998 (KR) ........................................ 1998-36493

(51) Int. Cl.[7] .......................... H04M 1/64; H04M 1/00; G06F 1/26
(52) U.S. Cl. ..................... 379/68; 379/433.06; 379/915; 713/324
(58) Field of Search .................... 379/67.1, 68, 395.01, 379/100.06, 88.13, 915, 433.06, 70, 88.12; 713/320, 324

(56) References Cited

U.S. PATENT DOCUMENTS

| | | | |
|---|---|---|---|
| 4,578,537 A | | 3/1986 | Faggin et al. |
| 5,036,534 A | | 7/1991 | Gural |
| 5,471,470 A | * | 11/1995 | Sharma et al. ............... 370/271 |
| 5,495,528 A | * | 2/1996 | Dunn et al. ............ 379/100.06 |
| 5,530,894 A | | 6/1996 | Farrell et al. |
| 5,548,763 A | | 8/1996 | Combs et al. |
| 5,590,339 A | | 12/1996 | Chang |
| 5,734,701 A | * | 3/1998 | Kuwabara et al. ....... 379/88.23 |
| 5,758,081 A | | 5/1998 | Aytac |
| 5,761,644 A | | 6/1998 | Ueda et al. |
| 5,794,058 A | * | 8/1998 | Resnick ...................... 713/323 |
| 5,832,062 A | | 11/1998 | Drake |
| 5,938,772 A | * | 8/1999 | Welch ........................ 713/320 |
| 5,942,986 A | | 8/1999 | Shabot et al. |
| 5,958,055 A | * | 9/1999 | Evoy et al. ................. 713/310 |
| 6,137,677 A | * | 10/2000 | Ganthier et al. ............. 361/683 |
| 6,229,878 B1 | * | 5/2001 | Moganti ..................... 379/67.1 |

FOREIGN PATENT DOCUMENTS

| | | | |
|---|---|---|---|
| CN | 1102717 | | 5/1995 |
| EP | 0812097 | | 5/1997 |
| JP | 08-186637 | * | 7/1996 |

OTHER PUBLICATIONS

Translation for Chinese Patent Office Action in corresponding co–pending Ser. No. 99118383.5 dated Jun. 14, 2002.
Chinese Patent Office Action in corresponding co–pending Ser. No. 99118383.5 dated Jun. 14, 2002.
U.S. patent No. 5,548,763 issued on Aug. 20, 1996 corresponding to CN1102717, which was cited in the Chinese Office Action.

* cited by examiner

Primary Examiner—Fan Tsang
Assistant Examiner—Simon P. Sing
(74) Attorney, Agent, or Firm—Robert E. Bushnell, Esq.

(57) ABSTRACT

A computer having automatic answering state displaying and processing functions includes an automatic answering setting unit for outputting an automatic answering guide message, preset by a user, for when a telephone call from the outside is received through a modem, portion for storing a predetermined received message from the outside according to the automatic answering guide message, portion for displaying that there is the received message in response to a display signal, a telephone button for generating an answering confirmation signal when the user notices the display portion and presses the telephone button, a microcomputer for generating the display signal to control the display portion, if there is the received message, and detecting the answering confirmation signal generated from the telephone button, and an automatic answering processing unit for informing the microcomputer that the received message is stored in the storage portion and informing the user of the received message from the storage portion according to the answering confirmation signal transmitted through the microcomputer.

26 Claims, 10 Drawing Sheets

COMPUTER HAVING AUTOMATIC ANSWERING STATE DISPLAYING AND PROCESSING FUNCTIONS AND METHOD OF PROCESSING AUTOMATIC ANSWERING

CLAIM OF PRIORITY

This application makes reference to, incorporates the same herein, and claims all benefits accruing under 35 U.S.C. § 119 from an application entitled COMPUTER HAVING THE FUNCTION OF AUTO-ANSWERING STATUS DISPLAYING AND PROCESSING METHOD earlier filed in the Korean Industrial Property Office on the $4^{th}$ day of Sep. 1998, and there duly assigned Serial No. 98-36493, a copy of which is annexed hereto.

BACKGROUND OF THE INVENTION

1. Technical Field

The present invention relates to a computer, and more particularly, to a computer having automatic answering functions, and also a method of processing automatic answering.

2. Related Art

A modem currently used for a computer system has many functions such as a modulation and a demodulation process to convert digital signals used in the computer system to analog signals and transfer the converted signals via a communications line such as a telephone line. The modem also has a dialing function to an apparatus at a remote place, a data compression and decompression function, and a transmission error correcting function. Particularly, a communications service program regarding a telephone and a facsimile has been actively developed among the diverse functions of the modem.

However, the computer communications service related to the telephone and facsimile does not currently provide an automatic answering function with an easy to use and convenient user interface as in an ordinary telephone. Also, when a message is left in the absence of a user, the user is not automatically notified of the presence of the message unless the user checks the message using a receiving confirmation program. Further, when the computer is turned off, one must turn on the computer to check whether a message is left.

I have found that it can be extremely inconvenient for a user to utilize a computer for certain telephone-related functions. Efforts have been made to interface computers with telephone communication lines.

Exemplars of recent efforts in the art include U.S. Pat. No. 5,942,986 for SYSTEM AND METHOD FOR AUTOMATIC CRITICAL EVENT NOTIFICATION issued to Shabot et al., U.S. Pat. No. 5,832,062 for AUTOMATED VOICE MAIL/ANSWERING MACHINE GREETING SYSTEM issued to Drake, U.S. Pat. No. 5,761,644 for ELECTRONIC SECRETARY SYSTEM WITH ANIMATED SECRETARY CHARACTER ISSUED to Ueda et al., U.S. Pat. No. 5,758,081 for COMPUTER AND COMMUNICATIONS TRANSMITTING, RECEIVING SYSTEM, WITH A PUSH BUTTON INTERFACE, THAT IS CONTINUOUSLY ON, THAT PAIRS UP WITH A PERSONAL COMPUTER AND CARRIES OUT MAINLY COMMUNICATIONS RELATED ROUTINE TASKS issued to Aytac, U.S. Pat. No. 5,590,339 for INPUT DEVICE INTERFACE WITH POWER CONNECT STATE AND SERIAL DATA CHANNEL ENABLING POWER TO THE DEVICE FROM TIME TO TIME issued to Chang, U.S. Pat. No. 5,530,894 for ADAPTER FOR INTERFACING A COMPUTER TO A MULTICHANNEL DIGITAL NETWORK, WITH PORT FOR A TELEPHONE issued to Farrell et al., U.S. Pat. No. 5,036,534 for AUTOMATIC ANSWERING SYSTEMS, AND METHOD OF USING issued to Gural, and U.S. Pat. No. 4,578,537 for TELECOMMUNICATION APPARATUS SERVING AS AN INTERFACE BETWEEN A DIGITAL COMPUTER AND AN ANALOG COMMUNICATION MEDIUM issued to Faggin et al.

While these recent efforts provide advantages, I note that they fail to adequately provide a computer having automatic telephone answering functions and a method of processing automatic telephone answering.

SUMMARY OF THE INVENTION

To solve the above problems, it is an objective of the present invention to provide a computer having an automatic answering state displaying and processing function which provides a convenient user interface by displaying a state when there is a received message according to an automatic answering preferences and allowing the user to confirm the message by pressing a telephone button regardless of whether the computer is turned on or off.

Also, it is another objective of the present invention to provide a method of processing automatic answering in a computer system.

Accordingly, to achieve the above objective, there is provided a computer having automatic answering state displaying and processing functions, which comprises: an automatic answering setting unit for outputting an automatic answering guide message, preset by a user, for when a telephone call from the outside is received through a modem; means for storing a predetermined received message from the outside according to the automatic answering guide message; means for displaying that there is the received message in response to a display signal; a telephone button for generating an answering confirmation signal when the user notices the display means and presses the telephone button; a microcomputer for generating the display signal to control the display means, if there is the received message, and detecting the answering confirmation signal generated from the telephone button; and an automatic answering processing unit for informing the microcomputer that the received message is stored in the storage means and informing the user of the received message from the storage means according to the answering confirmation signal transmitted through the microcomputer.

Also, to achieve the other object of the present invention, there is provided a method of processing automatic answering in a computer system having a predetermined display means and a predetermined telephone button on the front surface of a computer main body, which comprises the steps of: (A) setting automatic answering by receiving an automatic answering guide message from a user; (B) if a telephone call from the outside is connected, transmitting the preset automatic answering guide message; (C) if a predetermined received message is received from the outside according to the automatic answering message, storing the received message and indicating using the display means that a stored message exists; and (D) if the user notices the display means and presses the telephone button, informing the user of the received message.

To achieve these and other objects in accordance with the principles of the present invention, as embodied and broadly described, the present invention provides an apparatus, comprising: a computer unit having a processor processing data and having a modem modulating and demodulating signals; a first unit outputting first instructions when a telephone message is received through said modem; a second unit storing said received telephone message in accordance with said first instructions; a third unit being emitting a notification signal in response to a display signal when said received telephone message is stored; a telephone switch generating an answering signal when a user manipulates said telephone switch, the user manipulating said telephone switch in response to receiving said notification signal from said third unit; a microcomputer generating said display signal to control said third unit when said received telephone message is stored, and detecting said answering signal generated from said telephone switch; and a fourth unit sending first data to said microcomputer when said received telephone message is stored in said second unit, said fourth unit outputting said received telephone message stored in said second unit to the user in response to said answering signal transmitted through said microcomputer. The received telephone message can correspond to a telephone call received from an external source.

To achieve these and other objects in accordance with the principles of the present invention, as embodied and broadly described, the present invention provides a computer apparatus having automatic answering displaying and processing functions, comprising: a first unit outputting first instructions when a telephone message is received through a modem, said first instructions being preset by a user; a second unit storing said received telephone message in accordance with said first instructions; a third unit being emitting a notification signal in response to a display signal when said received telephone message is stored; a switch generating an answering signal when a user manipulates said switch, the user manipulating said switch when the user receives said notification signal; a microcomputer generating said display signal to control said third unit when said received telephone message is stored, and detecting said answering signal generated from said telephone switch; and a fourth unit notifying said microcomputer when said received telephone message is stored in said second unit, said fourth unit outputting said received telephone message stored in said second unit to the user in response to said answering signal transmitted through said microcomputer; said microcomputer restoring said computer apparatus to a normal power-on mode when said telephone message is received through said modem while said computer apparatus is in a power mode selected from among a power-save mode and a power-off mode.

To achieve these and other objects in accordance with the principles of the present invention, as embodied and broadly described, the present invention provides a method of processing automatic answering in a computer system having a predetermined display unit and a predetermined telephone button on a front surface of a computer main body, said method comprising the steps of: setting automatic answering by receiving an automatic answering guide message from a user; when a telephone call from an external source is connected, transmitting said preset automatic answering guide message; when a received message is received from the external source according to said automatic answering guide message, storing said received message and indicating that a stored message exists through said display unit; and when the user observes said display unit and presses said telephone button, informing the user of said received message.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
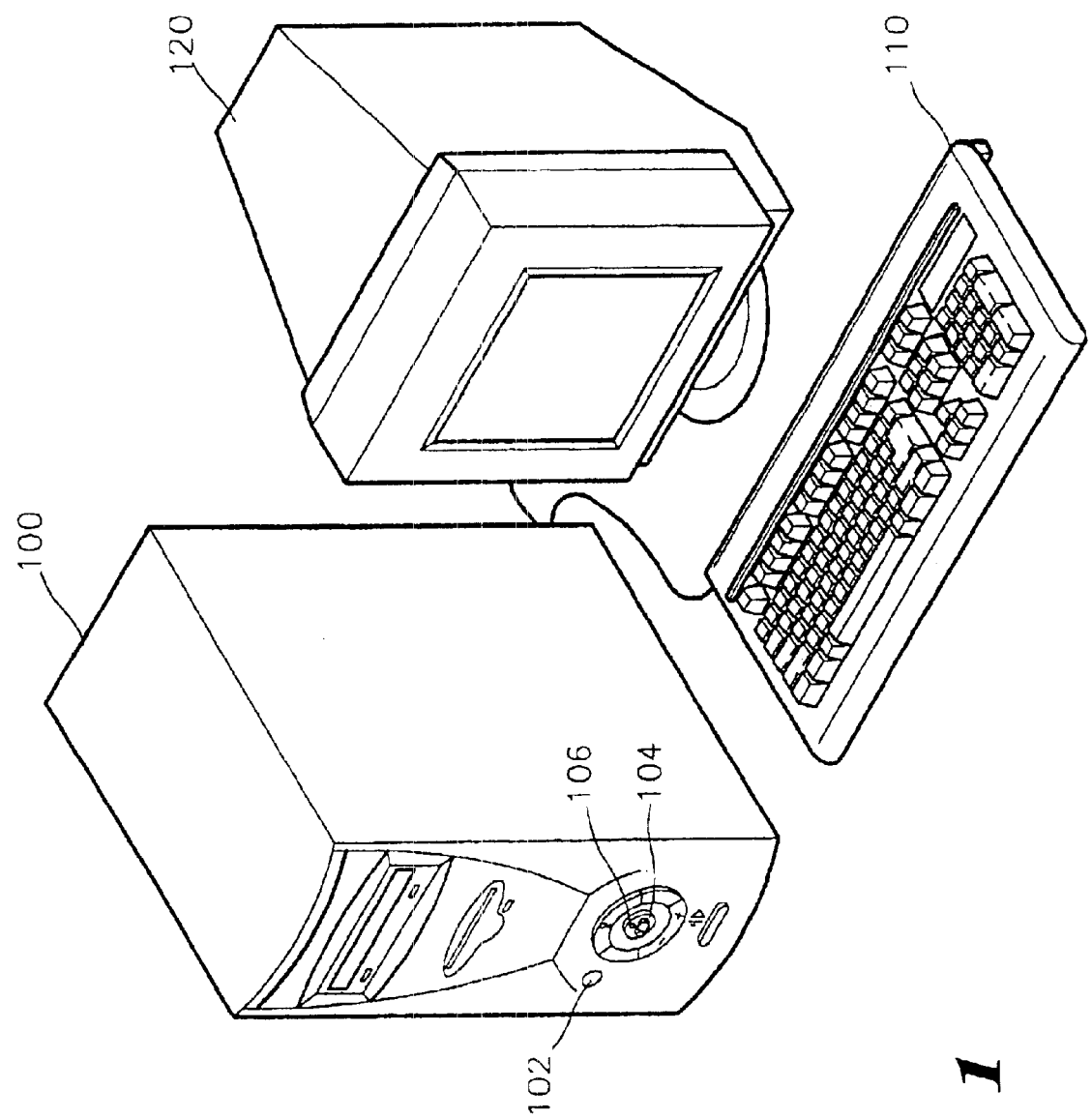
FIG. 1 is a perspective view showing the outer appearance of a computer system, in accordance with the principles of the present invention.

FIG. 1 shows the outer appearance of a computer system according to the present invention. The computer system is composed of a main body 100, a keyboard 110 and a monitor 120 which are typical input and output devices of a computer. The computer main body 100 has buttons for various functions on the front surface thereof such as a power button 102, and a telephone button 104 which is a characteristic feature of the present invention. An answering light emitting diode (LED) 106 related to an automatic answering state displaying function is disposed above the telephone button 104.

As shown in FIG. 1, it can be seen that the front surface of a computer main body according to the present invention is different from that of a general computer main body. The answering LED 106 lights up when a voice or facsimile message from the outside is received through a modem and is turned off when a user presses the telephone button 104 and checks the received message. A signal is generated by pressing the telephone button 104 and detected by a microcomputer 240 (see FIG. 2) and transferred to an automatic answering processing apparatus 200 (see FIG. 2) of a computer system. Also, the microcomputer 240 being controlled by the automatic answering processing apparatus 200 turns the answering LED 106 on or off.

Figure 2:
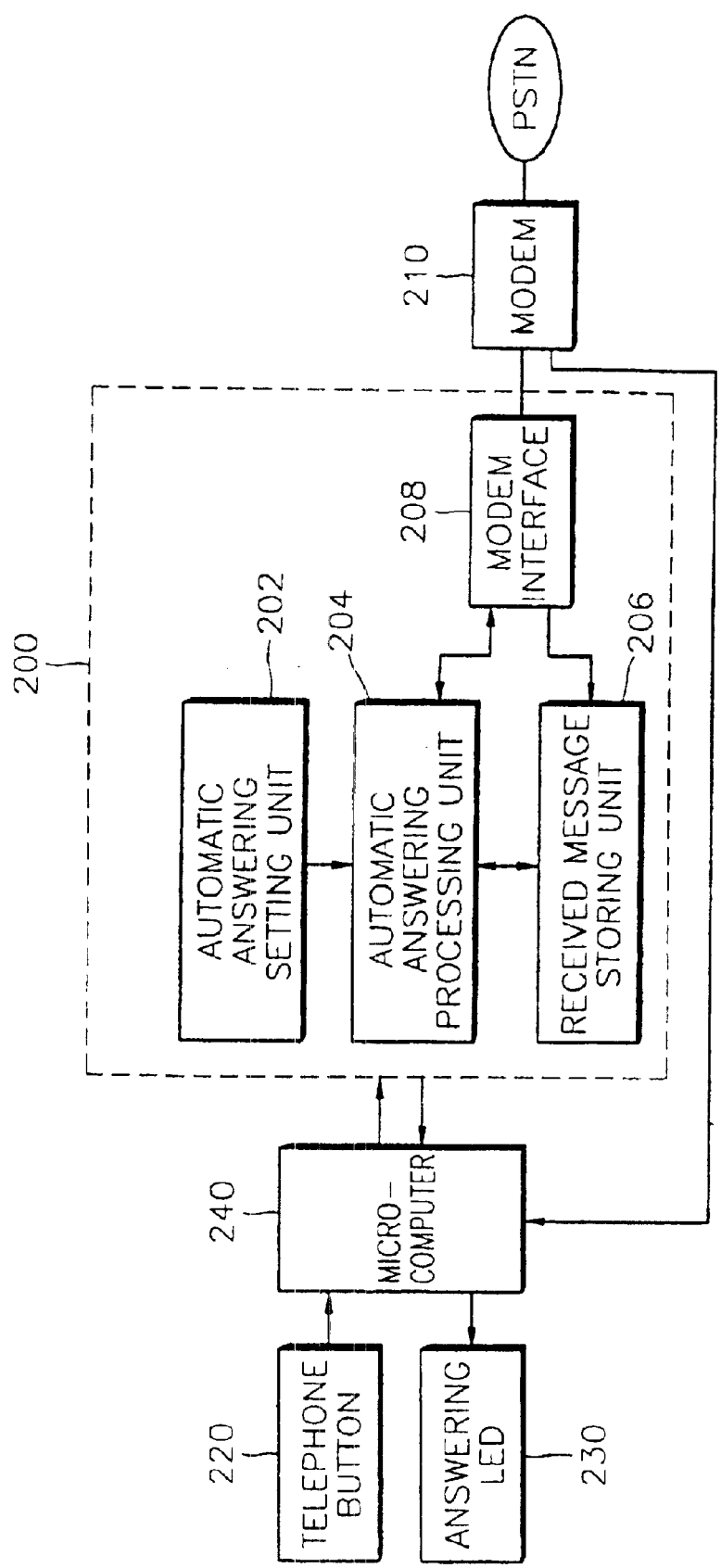
FIG. 2 is a block diagram showing a computer having automatic answering state displaying and processing functions, according to a preferred embodiment of the present invention.

FIG. 2 shows a computer having automatic answering state displaying and processing functions according to a preferred embodiment of the present invention. The computer includes an automatic answering processing apparatus 200, a modem 210, a telephone button 220, an answering light emitting diode (LED) 230, and a microcomputer 240. The automatic answering processing apparatus 200 consists of an automatic answering setting unit 202, an automatic answering processing unit 204, a received message storing unit 206, and a modem interface 208.

Referring to FIG. 2, when a telephone call from the outside is received through the modem 210 connected to a public switched telephone network (PSTN), the automatic answering processing apparatus 200 transmits an automatic answering guide message which is previously set by a user. If the caller leaves a message, the received message is stored and the microcomputer 240 is informed of such a fact. The microcomputer 240 generates a display signal controlling the answering LED 230 if there is a stored received message. The answering LED 230 lights up in response to the display signal to indicate that there is a received message.

If a user sees flickering of the answering LED 230 and presses a telephone button 220, the telephone button 220 generates an answering confirmation signal. The microcomputer 240 detects the answering confirmation signal and sends it to the automatic answering processing apparatus 200. Then, the automatic answering processing apparatus 200 informs the user of the received message according to the answering confirmation signal sent through the microcomputer 240.

The actions by the telephone button 220, the answering LED 230, and the automatic answering processing apparatus 200 are made regardless of whether the power of the computer is turned on or off. The supply of power is controlled by the microcomputer 240. The telephone button 220 and the microcomputer 240 remain in a power-on state if the computer is turned off (in a state in which the power cord itself is not unplugged). Particularly, the microcomputer 240 detects any event and controls the power supply.

When the user sets automatic answer using the automatic answering processing apparatus 200 and then turns off the computer, the microcomputer 240 detects a telephone call from the outside through the modem 210 and supplies the power to operate the automatic answering processing apparatus 200. Also, when the computer is turned off or in a power-save mode, and a user presses the telephone button 220, the microcomputer 240 restores the computer to a normal state so that the automatic answering processing apparatus 200 can operate.

The automatic answering processing apparatus 200 can consist of an automatic answering setting unit 202, an automatic answering processing unit 204, a received message storing unit 206, and a modem interface 208.

The automatic answering processing unit 204 informs the microcomputer 240 that a message is stored on the received message storing unit 206. The microcomputer 240 controls the answering LED 230 to light up. A sound unit can be used in place of or in addition to the LED 230. The sound unit will emit sound when a message is stored. When the user notices the answering LED 230 and presses the telephone button 220, the microcomputer 240 detects an answering confirmation signal. The automatic answering processing unit 204 receives the answering confirmation signal through the microcomputer 240 and reads the message stored on the received message storing unit 206. Thus, when the message is a voice message, the automatic answering processing unit 204 plays the voice message. When the message is a facsimile message, the automatic answering processing unit 204 displays the message in text. For example, in the circumstances in which the answering LED 230 is turned off, when the telephone button 220 is selected and there is no message stored on the received message storing unit 206, the automatic answering processing unit 204 loads a default program related to a telephone and provides it to the user, as a preferred embodiment of the present invention.

Figure 3A:
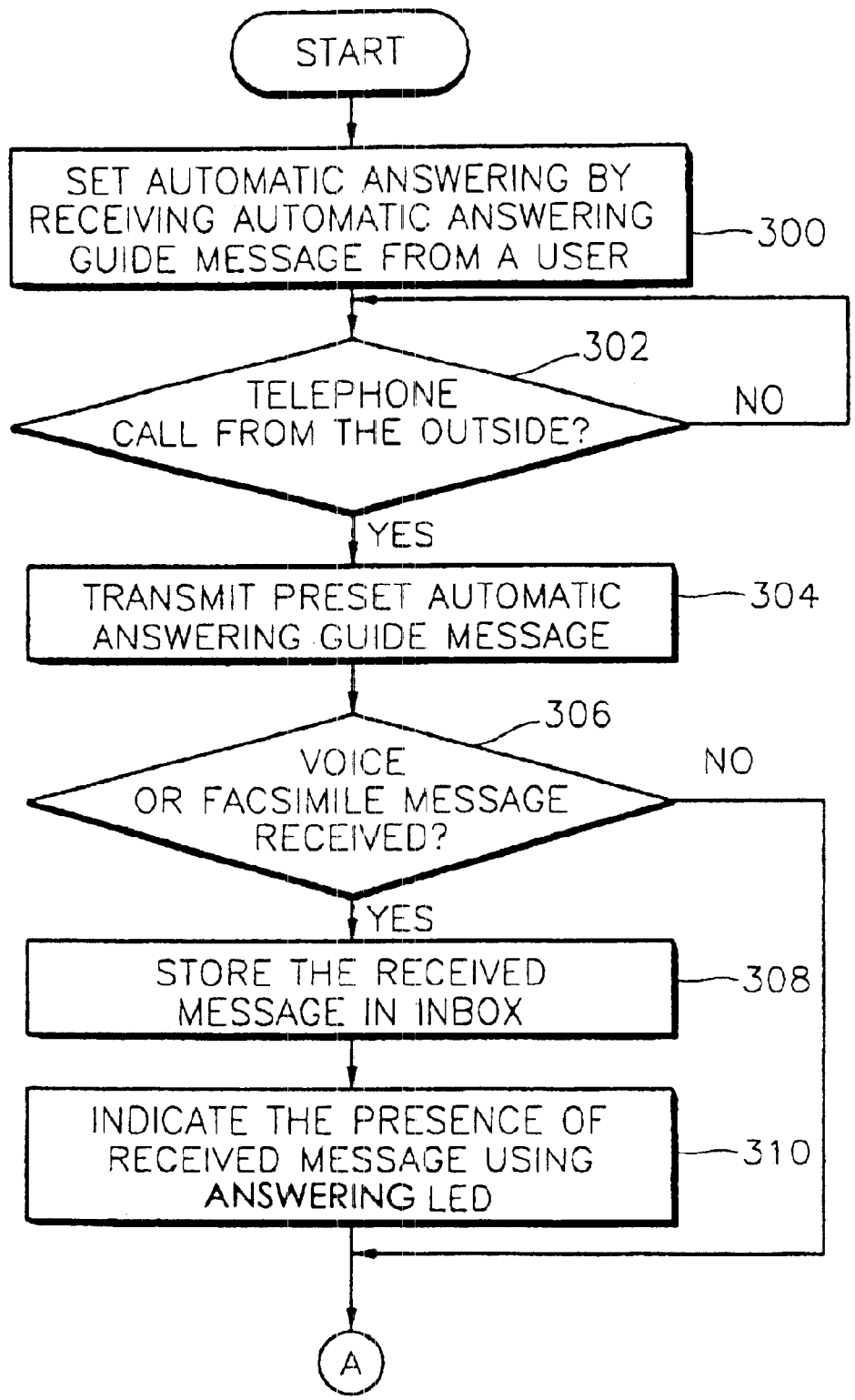
FIGS. 3A and 3B show a flow chart for explaining an automatic answering processing method in a computer system, according to a preferred embodiment of the present invention.
Figure 3B:
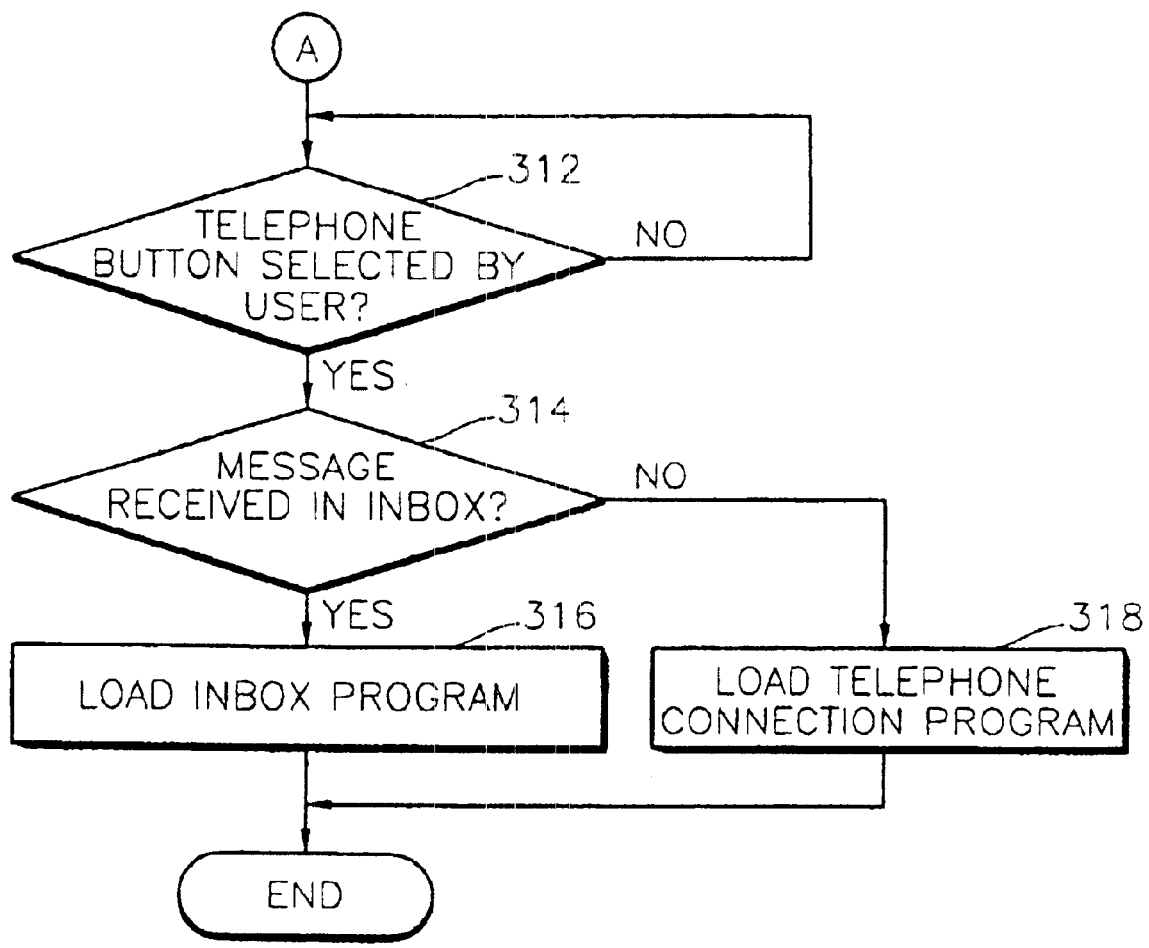

FIGS. 3A and 3B show a flow chart for explaining the automatic answering processing method in a computer system according to a preferred embodiment of the present invention. First, at step 300, an automatic answering message recorded by a user is input and automatic answering is set. In the process of setting the automatic answering, screens can be provided, for example, as follows.

Figure 4:
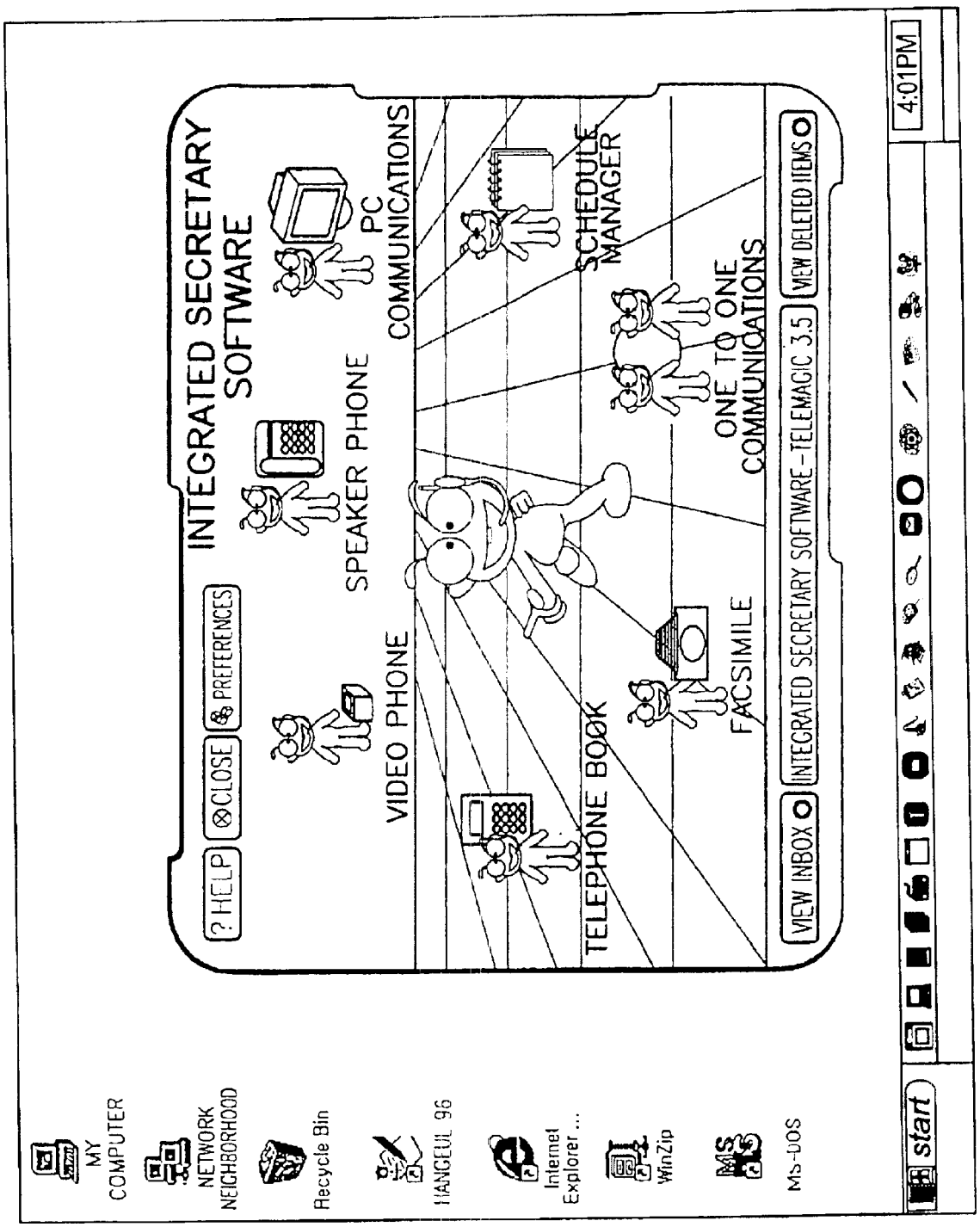
FIG. 4 is a view showing an example of an application program to which the present invention is applied.

FIG. 4 shows an example of an application program to which the present invention is applied. That is, software named "Integrated Secretary" including an automatic answering setting module according to the present invention is shown. The software can incorporate various programs providing communications services through a personal computer (PC) such as a speaker phone, a video phone, a phone book, a facsimile, one-to-one communications, a schedule manager, and personal computer (PC) communications. The personal computer can be a portable computer such as a palm-sized computer, a wearable computer, a notebook computer, or a laptop computer. The personal computer can also be a larger computer such as a desktop computer.

Figure 5:
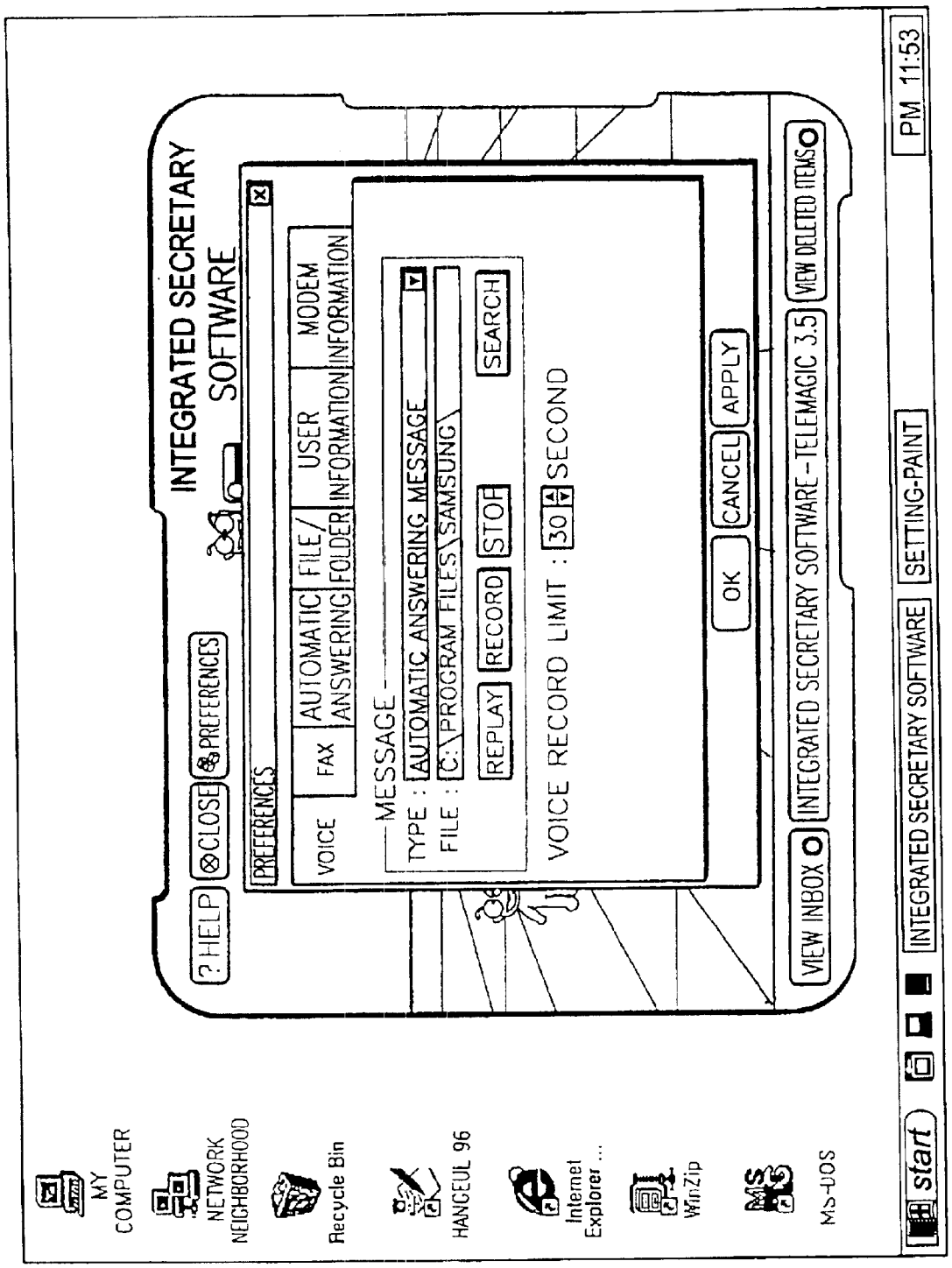
FIG. 5 is a view showing a voice recording screen of a preferences menu shown in FIG. 4, in accordance with the principles of the present invention.

FIG. 5 shows a voice storing screen in a "preferences" menu shown in FIG. 4. When a user selects the "preferences" menu positioned at the top of the screen of the above software shown in FIG. 4, for example, a window relating to a voice setting and automatic answering is displayed. The user records the automatic answering message required for the automatic voice answering setting in voice and stores the voice message in a designated file or a new file.

Figure 6:
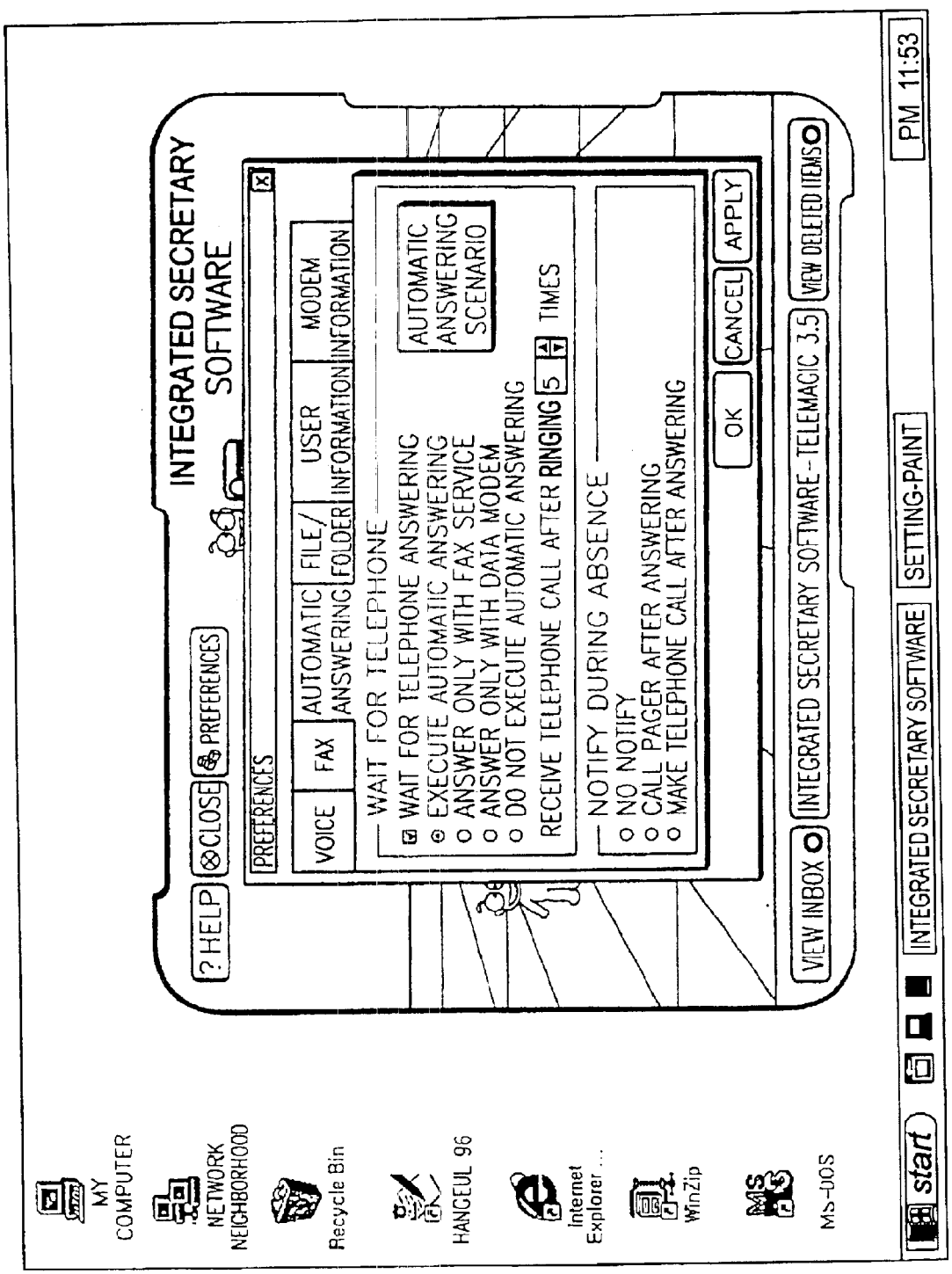
FIG. 6 is a view showing an automatic answering preferences screen of a preferences menu, in accordance with the principles of the present invention.

FIG. 6 shows an automatic answering setting screen of the setting menu which is displayed when the user selects "automatic answering" from the preference menu shown in FIG. 5. When "execute automatic answering" is selected from the screen and a confirmation button is selected at the bottom of the screen, the preset automatic answering message is output in response to a telephone call from the outside through the modem.

Figure 7:
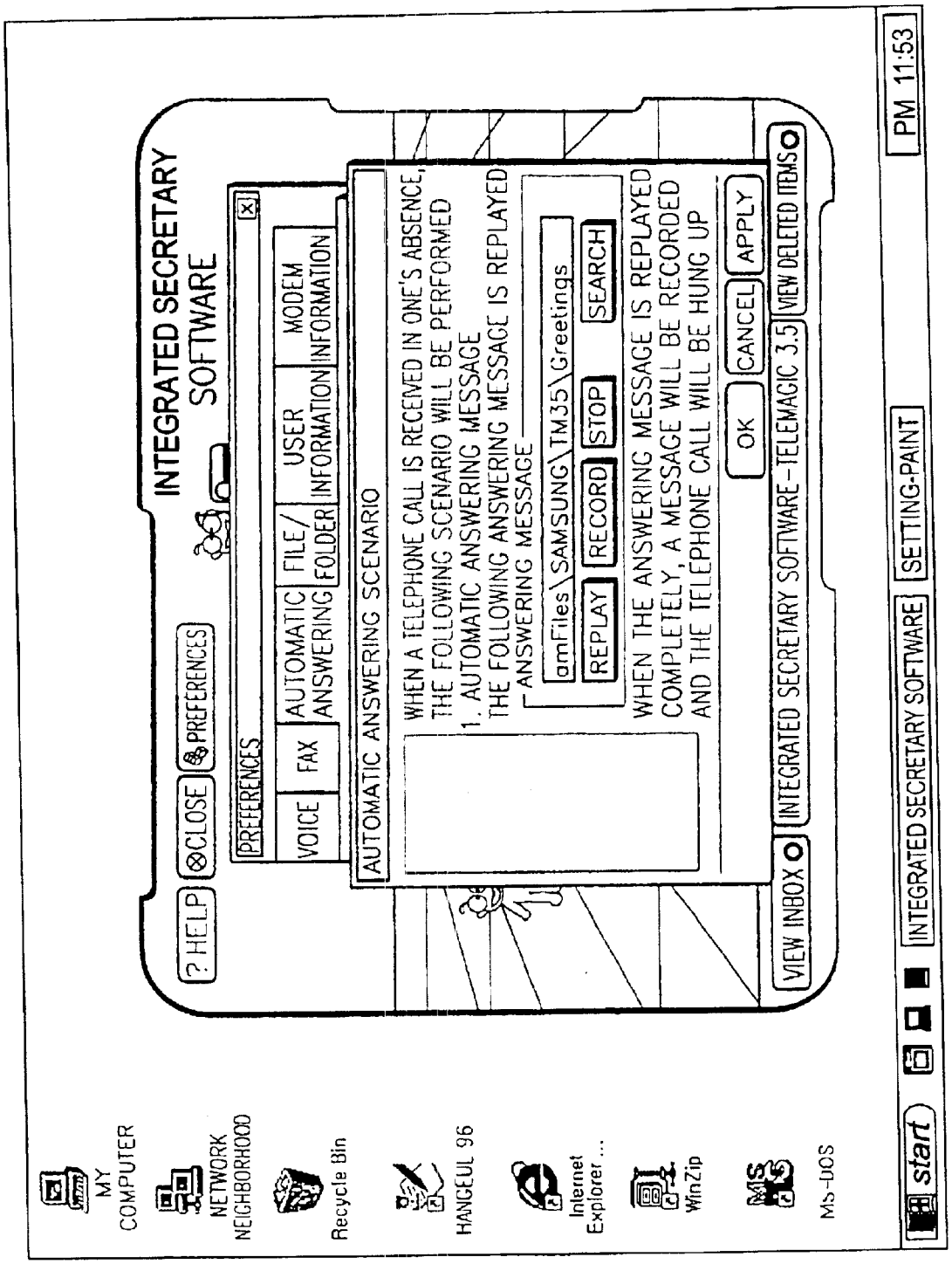
FIG. 7 is a view showing a screen when a menu of "automatic answering scenario" is selected from the menu in FIG. 6, in accordance with the principles of the present invention.

FIG. 7 shows a screen displayed when "automatic answering scenario" is selected from the screen shown in FIG. 6. When the user selects "automatic answering scenario", the screen shows which steps will be performed according to the scenario if a telephone call is received in the absence of the user.

Referring back to FIG. 3, at step 302, after automatic answering is set in the afore-said method in step 300, it is determined whether there is a telephone call from the outside received. At step 304, if there is a telephone call from the outside, as shown in FIG. 7, the preset automatic answering guide message is transmitted. At step 306, next, it is determined whether there is a voice or facsimile message left in response to the automatic answering guide message. At step 308, if there is any message left, the received message is stored in the inbox for storing the received message. At step 310, the answering light emitting diode (LED) lights up so that the user can notice the presence of the stored received message. If it is determined at step 306 that there is no received message present, then step 312 is performed bypassing the above-described steps 308 and 310.

At step 312, after step 310 or 306, the telephone button for confirming the received message is checked to determine whether it has been selected. At step 314, when the telephone button is selected, it is determined whether there is a received message in the inbox. At step 316, if there is a received message, an inbox program for reading the received message stored in the inbox is loaded. At step 318, if there is no received message, a telephone connection program is loaded as a default program.

Figure 8:
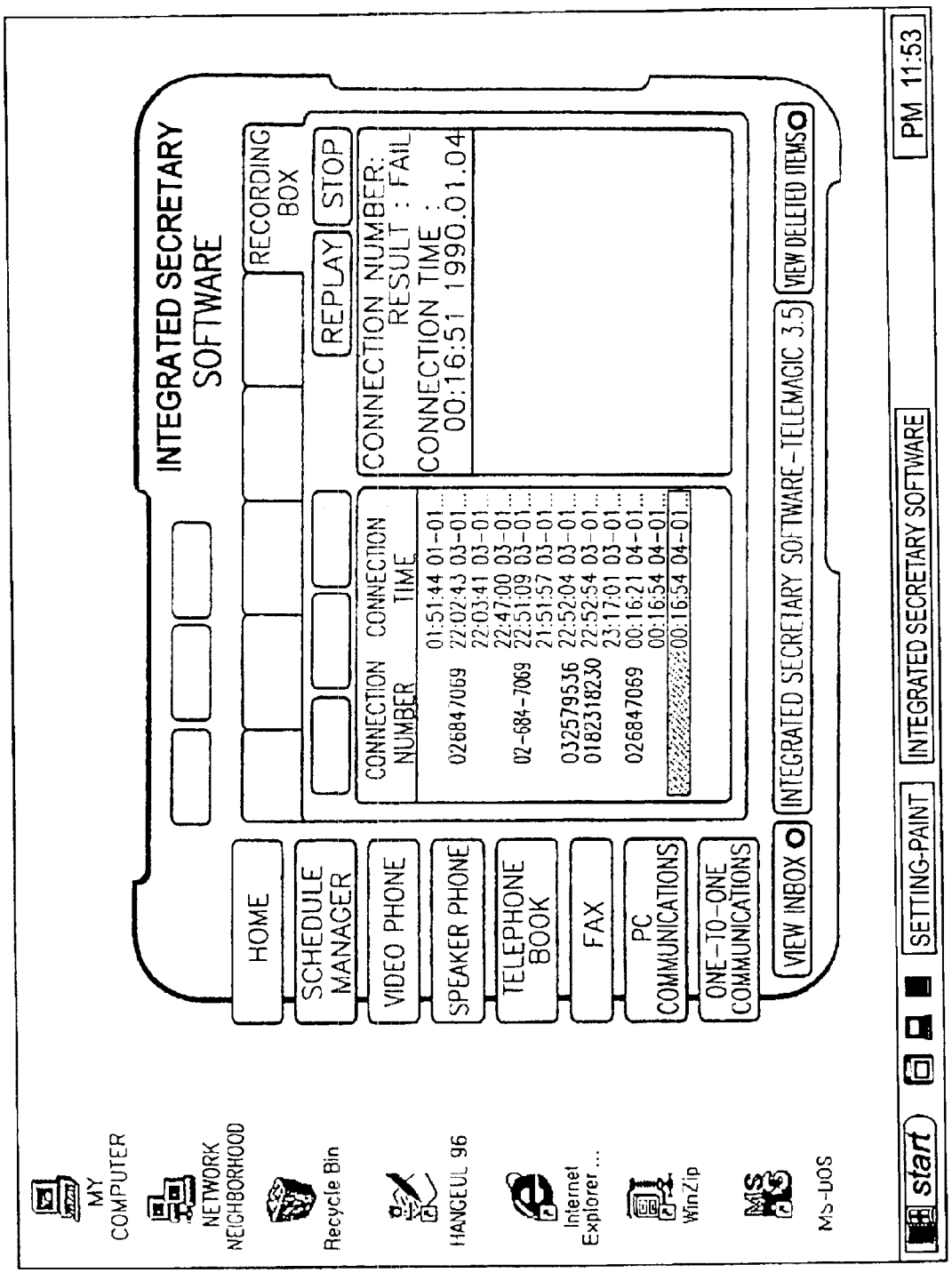
FIG. 8 is a view showing an inbox viewing screen which is displayed after a user presses a telephone button, when there is a received message, in accordance with the principles of the present invention.

FIG. 8 shows an inbox viewing screen opened when the telephone button is selected by a user when a received message is present. FIG. 8 is displayed when "view inbox" positioned in the lower portion of the Integrated Secretary software window is selected. Also, the above screen is a result of a program performed after the computer is automatically restored to a normal state, when the user selects the telephone button in the state where the computer is turned off and the answering LED is lighting up. When the user selects "replay" positioned in the upper portion of the inbox viewing screen shown in FIG. 8, the user can listen to the stored received message.

Figure 9:
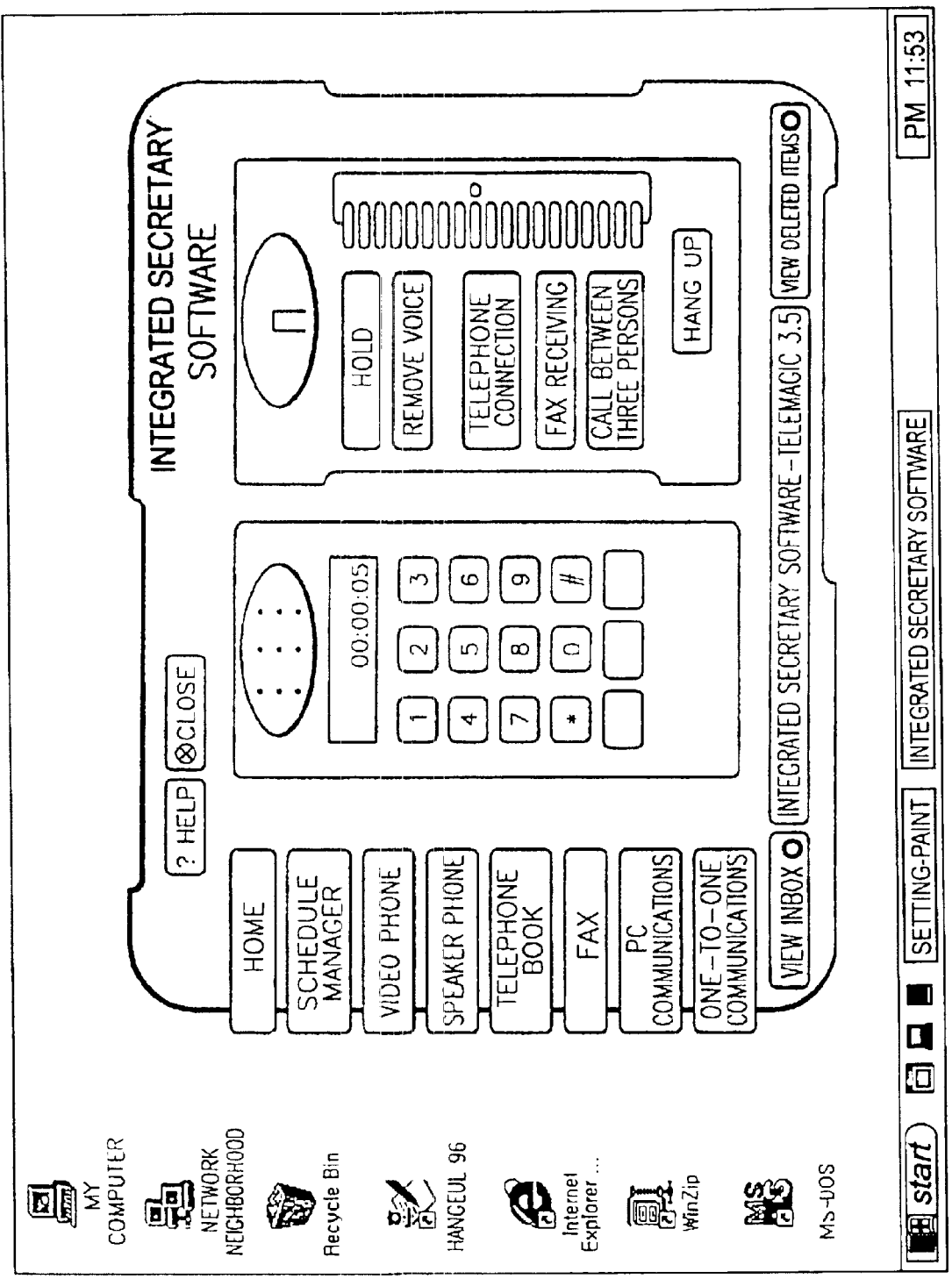
FIG. 9 is a view showing a telephone call screen which is displayed after a user presses a telephone button, when there is no received message, in accordance with the principles of the present invention.

FIG. 9 shows a telephone dialing screen displayed when the user selects the telephone button when there is no received message. The screen of the FIG. 9 is displayed when a "speaker-phone" icon is selected in the Integrated Secretary software. Also, the above screen is a result of a program performed after the computer is automatically restored to a normal state, when the user selects the telephone button in the state where the computer is turned off and the answering LED is turning off.

As described above, according to the computer having automatic answering state displaying and processing functions and the method of processing automatic answering, a received message can be easily checked in the state where the computer is turned off.

The foregoing paragraphs describe the details of a computer, and more particularly, to a computer having automatic answering state displaying and processing functions and a method of processing automatic answering.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A computer apparatus having automatic answering displaying and processing functions, comprising:

a first unit outputting first instructions when a telephone call is received through a modem, said first instructions being preset by a user;

a second unit storing a received telephone message in accordance with said first instructions;

a third unit emitting a notification signal in response to a display signal when said received telephone message is stored;

a switch generating an answering signal when a user manipulates said switch, the user manipulating said switch when the user receives said notification signal;

a microcomputer generating said display signal to control said third unit when said received telephone message is stored, and detecting said answering signal generated from said telephone switch; and a fourth unit notifying said microcomputer when said received telephone message is stored in said second unit, said fourth unit outputting said received telephone message stored in said second unit to the user in response to said answering signal transmitted through said microcomputer;

said microcomputer restoring said computer apparatus to a normal power-on mode when said telephone call is received through said modem while said computer apparatus is in a power mode selected from among a power-save mode and a power-off mode;

wherein when said second unit is not storing said received telephone message, said computer loading a program having a plurality of telephone-related functions in response to a manipulation of said switch.

2. The apparatus of claim 1, the plurality of telephone-related functions including at least one selected from among a video phone function, a speaker phone function, a computer communication function, a facsimile function, a telephone book function, and a preferences menu.

3. The apparatus of claim 2, said switch being positioned on a body of said computer.

4. The apparatus of claim 3, said computer further comprising a monitor displaying varying visual images, said monitor displaying at least two of the plurality of telephone-related functions.

5. The apparatus of claim 4, at least one telephone-related function being selected from among the at least two telephone-related functions displayed.

6. The apparatus of claim 5, when the at least one telephone-related function selected corresponds to the preferences menu, setting an answering message to be output when said telephone call is received at said computer.

7. The apparatus of claim 6, said setting of the answering message corresponding to identifying an audio file to be played when said telephone call is received at said computer.

8. The apparatus of claim 7, said computer outputting an audio signal when said second unit is storing the telephone message.

9. A method of operating a computer, comprising:

when a storage unit is not storing a first message, loading a program having a plurality of telephone-related functions in response to an operation of a switch on a computer; and when the storage unit is storing the first message, outputting the stored first message in response to the operation of the switch on the computer.

10. The method of claim 9, the first message corresponding to a telephone message received from an external source.

11. The method of claim 10, the telephone message corresponding to a received audio message, said outputting of the stored first message corresponding to outputting audio data of the stored message through at least one speaker.

12. The method of claim 10, the telephone message corresponding to a received facsimile message, said outputting of the stored first message corresponding to outputting text data onto a display.

13. The method of claim 9, the switch corresponding to a telephone button on a front surface of a main body of the computer, the operation of the switch corresponding to pressing the switch.

14. The method of claim 9, further comprising:
when the storage unit is storing the message, performing at least one selected from among turning on a light and outputting an audio signal.

15. The method of claim 9, said loading of the program having the plurality of telephone-related functions including displaying on a display at least two of the telephone-related functions.

16. The method of claim 15, the plurality of telephone-related functions including at least one selected from among a video phone function, a speaker phone function, a computer communication function, a facsimile function, a telephone book function, and a preferences menu.

17. The method of claim 16, the switch corresponding to a telephone button on the computer, the operation of the switch corresponding to pressing the switch.

18. The method of claim 16, further comprising:
selecting at least one telephone-related function from among the at least two telephone-related functions displayed on the display.

19. The method of claim 18, further comprising:
when said selecting corresponds to selecting the preferences menu, setting an answering message to be output when a telephone call is received at the computer.

20. The method of claim 19, said setting of the answering message corresponding to identifying an audio file to be played when the telephone call is received at the computer.

21. The method of claim 20, further comprising:
when the storage unit is storing the message, performing at least one selected from among turning on a light and outputting an audio signal.

22. The method of claim 21, the first message corresponding to a telephone message received from an external source.

23. The method of claim 22, the telephone message corresponding to a received facsimile message, said outputting of the stored first message corresponding to outputting text data onto a display.

24. The method of claim 22, the telephone message corresponding to a received audio message, said outputting of the stored first message corresponding to outputting audio data of the stored message through at least one speaker.

25. The method of claim 24, the switch corresponding to a telephone button on the computer, the operation of the switch corresponding to pressing the telephone button.

26. The method of claim 24, further comprising restoring the computer to a normal state when the telephone call is received while the computer is in a mode selected from among a power-save mode and a power-off mode.

* * * * *